United States Patent [19]

Tanahashi et al.

[11] Patent Number: 5,533,186
[45] Date of Patent: Jul. 2, 1996

[54] IMAGE FILING METHOD BASED ON SYMBOL RETRIEVAL CONDITION

[75] Inventors: Mariko Tanahashi; Keiichi Koike; Masatoshi Katoh, all of Kamakura, Japan

[73] Assignee: Mitsubishi Denki Kabushiki Kaisha, Tokyo, Japan

[21] Appl. No.: 19,038

[22] Filed: Feb. 18, 1993

[30] Foreign Application Priority Data

Feb. 28, 1992 [JP] Japan ................... 4-078524

[51] Int. Cl.[6] ................... G06F 12/00
[52] U.S. Cl. ................... 395/164; 395/162
[58] Field of Search ................... 395/135, 161, 395/162, 164; 364/413.13, 419.01, 419.1

[56] References Cited

U.S. PATENT DOCUMENTS

| | | | |
|---|---|---|---|
| 4,672,683 | 6/1987 | Matsueda | 395/135 |
| 4,945,476 | 7/1990 | Bodick et al. | 364/413.02 |
| 5,010,500 | 4/1991 | Makkuni et al. | 364/521 |

FOREIGN PATENT DOCUMENTS 63-254856  10/1988  Japan .

OTHER PUBLICATIONS

A. Del Bimbo, "A Three Dimensional Iconic Environment for Image Database Querying" IEEE Transactions on Software Eng. vol. 19, No. 10, Oct. 1993 pp. 997–1011.

T. Joseph & A. Cardenas "Picquery: A High Level Query Language For Pictorial Database Management" IEEE Transactions 1988.

T. Hawano "A Similarity Retrieval Method for Image Database Using Simple Graphics" IEEE 1988.

A. Yamamoto & M. Takagi "Extraction of Object Features and its Appliation to Image Retrieval" Transactions of IEICE Jun. 1989.

Primary Examiner—Mark R. Powell
Assistant Examiner—U. Chauhan
Attorney, Agent, or Firm—Wolf, Greenfield & Sacks

[57] ABSTRACT

An image filing method, in which a plurality of images are registered one by one, and the registered images are retrieved by adding a retrieval condition so as to be simple and not require time and labor at the registration and retrieval times. A plurality of symbols for featuring objects in the images are set in advance, and the images are registered corresponding to the selected symbols. At the image retrieval time, the symbols are selected, and the images corresponding to the selected symbols are read out.

37 Claims, 11 Drawing Sheets

| A | B | C |
|---|---|---|
| D | E | F |
| G | H | I |

| FILE CODE | KIND OF OBJECT | POSITION (BLOCK NO.) | SIZE (size) |
|---|---|---|---|
| 0001 | TREE | I | LL |
| 0002 | PERSON | E | L |
| | FLOWER | I | S |
| | FLOWER | I | S |
| 0003 | FLOWER | D | L |
| 0004 | FRUIT | E | M |
| | FRUIT | H | S |

| FILE CODE | KEYWORD | KIND OF OBJECT | $x_0$ | $y_0$ | $r_0$ |
|---|---|---|---|---|---|
| 0001 | — | PERSON | 20 | 28 | 15 |
| 0002 | CLOUD | PERSON | 46 | 60 | 30 |
| | | SKY | 50 | 15 | 33 |
| 0003 | VASE | TREE | 53 | 20 | 20 |
| 0004 | HANAKO | PERSON | 62 | 25 | 21 |

| FILE CODE | KEYWORD | COLOR 1 | COLOR 2 |
|---|---|---|---|
| 0001 | — | 50 | 42 |
| 0002 | — | 10 | 8 |
| 0003 | CAT | 10 | 70 |
| 0004 | MT. FUJI | 20 | 60 |
| 0005 | GLIDER | 3 | 1 |
| 0006 | TULIP | 15 | 20 |
|  |  |  |  |

IMAGE FILING METHOD BASED ON SYMBOL RETRIEVAL CONDITION

BACKGROUND OF THE INVENTION

1. Field of the Invention

The present invention relates to an image filing method, and more particularly to a data structure of retrieval information, a formation of the retrieval information and a graphical user interface.

2. Description of the Related Arts

In general, in an image data base, when image data are registered, a specific feature amount of each image is automatically calculated, and by registering its calculation result as retrieval information, the retrieval by using the feature amount of each image can be carried out.

On the basis of such a viewpoint, as shown in FIG. 1, a conventional image filing system has been proposed, as disclosed in Japanese patent Laid-Open No. Sho 63-254856. In FIG. 1, the image filing system includes a CPU 1 for controlling the whole system, an image input part part 2 for inputting multi-valued images from the outside, an image storage part 3 for storing the multi-valued images, an image retrieval part 4 for retrieving the multi-valued images stored in the image storage part 3 by using their retrieval information, an operational terminal part 5 for inputting operational instructions such as registration and retrieval instructions to the image retrieval part 4, an image display part 6 for displaying the multi-valued image input from the image input part part 2 or the reproduced multi-valued image retrieved from the image storage part 3 by the image retrieval part 4, a spectrum distribution calculation part 7 for calculating a spectrum distribution, that is, one item of statistical information of the multi-valued images input from the image input part 2, and a density distribution calculation part 8 for calculating a density distribution, that is, another item of statistical information of the multi-valued images input from the image input part part 2.

Next, the operation of this image filing system will be described. The operation of the image filing can be roughly divided into two operations such as a registration operation and a retrieval operation.

Firstly, at the registration time, a user inputs a suitable key word as retrieval information for an image from the operational terminal part 5. Also, a spectrum distribution of a multi-valued image to be registered is calculated in the spectrum distribution calculation part 7. Further, a density distribution of the multi-valued image to be registered is calculated in the density distribution calculation part 8. Then, from the obtained spectrum and density distributions, an expected value of the spectrum distribution as a measure of sharpness and an expected value of the density distribution as a measure of brightness are calculated, and the calculated values are registered together with other retrieval information.

Secondly, the operation at the retrieval time will be described in connection with FIG. 2. In an example shown in FIG. 2, a name having a common character "WEST" in its head and an unlimited symbol "*" in its latter part as a key word of names is input from the operational terminal part 5. Then, by a retrieval using this key word in the image retrieval part 4, a list of relevant images such as A, B, C and D is displayed and the firstly retrieved image A is displayed in the image display part 6. Next, when an instruction for a brighter and sharper image on the basis of the image A displayed in the image display part 6 is input from the operational terminal part 5, an expected value f1 of the spectrum distribution and an expected value g1 of the density distribution, that is, the retrieval information of the image A are compared with those of the other images, and the image D having a larger expected value f2 of the spectrum distribution and a larger expected value g2 of the density distribution is retrieved and displayed in the image display part 6.

In the conventional image filing system, as described above, after performing the keyword retrieval, an auxiliary secondary retrieval using the feature amounts such as the expected values f1 and g1 of the spectrum and density distributions is executed. Hence, the keyword input operations are required at the image registration and retrieval times, and it takes a lot of time and labor. In particular, the keyword registration operation at the image registration time is so important that how to give the key words may determine the performance of the whole image filing system. That is, it is necessary to allot key words which are readily identifiable with the images to be registered by an operator at the image registration time. Further, since there are different reasons between individuals for giving the key words, a registration error and a retrieval error is apt to occur, and as a whole, the registration operation and the retrieval operation become complicated.

Further, in a color image, when the retrieval is performed by using the measures such as the sharpness and the brightness as the feature amounts of the image, an image which does not sufficiently represent these feature of the color image can not be retrieved.

SUMMARY OF THE INVENTION

It is therefore an object of the present invention to provide an image filing method in view of the problems of the prior art, which is capable of performing a registration operation and a retrieval operation of images in a simple manner and performing a retrieval operation in an exact and quick manner on the basis of features of color images.

In accordance with one aspect of the present invention, there is provided an image filing method in which a plurality of images are registered in a storage means and retrieval of the registered images is executed by adding a retrieval condition, comprising the steps of: (a) setting a plurality of symbols for featuring the images in advance; (b) registering the images into the storage means corresponding to the selected symbols; and (c) selecting the symbols as the retrieval condition to read the images corresponding to the selected symbols out of the storage means. Further, the step (b) can include displaying the selected symbols in a particular area on a picture screen; and registering the images into the storage means corresponding to the selected symbols, and positions and sizes of the selected symbols within the particular area, and the step (c) can include selecting the symbols and the positions and sizes of the selected symbols within the particular area as the retrieval condition; and reading the images corresponding to the selected symbols, and the positions and sizes of the selected symbols out of the storage means.

In accordance with another aspect of the present invention, there is provided an image filing method in which a plurality of images are registered in a storage means and retrieval of the registered images is executed by adding a retrieval condition, comprising the steps of: (a) dividing a color space into a plurality of color areas to set symbols specific to the color areas; (b) registering the images into the storage means corresponding to at least one condition of kinds, positions and sizes of the symbols; and (c) reading the images corresponding to at least one condition of the kinds, the positions and sizes of the symbols as the retrieval condition out of the storage means.

In accordance with a further aspect of the present invention, there is provided an image filing method in which a plurality of images are :registered in a storage means and retrieval of the registered images is executed by adding a retrieval condition, comprising the steps of: (a) dividing a color space into a plurality of color areas to calculate pixel numbers included in the color areas; (b) registering the images into the storage means corresponding to the color areas and amounts corresponding to the pixel numbers; and (c) reading the images corresponding to the color areas and the amounts corresponding to the pixel numbers as the retrieval condition out of the storage means.

In accordance with still another aspect of the present invention, there is provided an image filing method in which a plurality of images are registered in a storage means and retrieval of the registered images is executed by adding a retrieval condition, comprising the steps of: (a) calculating feature amounts of the images; (b) registering the images along with the feature amounts into the storage means; and (c) reading the images corresponding to a range of the feature amounts as the retrieval condition out of the storage means.

According to the present invention, the information of the kinds of the symbols featuring the images, and the positions and sizes of the symbols is stored as the retrieval data for the registered images, and at the retrieval time, the information of the kinds, the positions and the sizes of the symbols is retrieved as the retrieval condition.

Further, since the symbols can act to specify the color areas divided in advance, at the retrieval time, the above-described information such as the kinds, the positions and the sizes of the symbols are set and the retrieval is executed.

Also, the pixel numbers of the color areas divided in advance are calculated and stored, and at the retrieval time, the color areas and the amounts corresponding to the pixel amounts are set and the retrieval is executed.

Further, the feature amounts of the images are calculated and stored, and it is constructed that at the retrieval time, the retrieval condition setting the range of the feature amounts can be given. At the retrieval time, the range of the feature amounts can be changed.

BRIEF DESCRIPTION OF THE DRAWINGS

The objects, features and advantages of the present invention will become more apparent from the consideration of the following detailed description, taken in conjunction with the accompanying drawings, in which.

DESCRIPTION OF THE PREFERRED EMBODIMENTS

Figure 1:
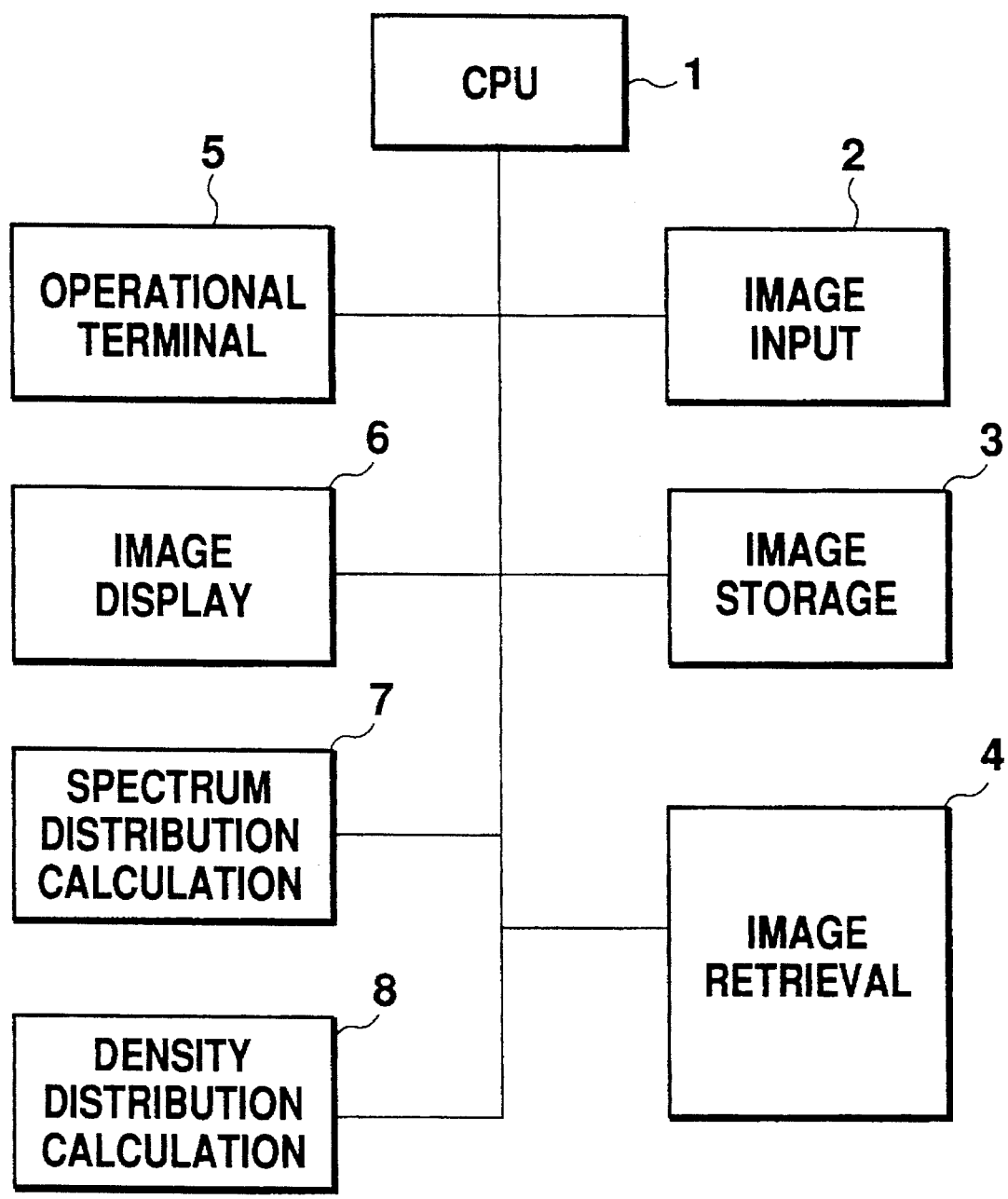
FIG. 1 is a block diagram of a conventional image filing system.
Figure 2:
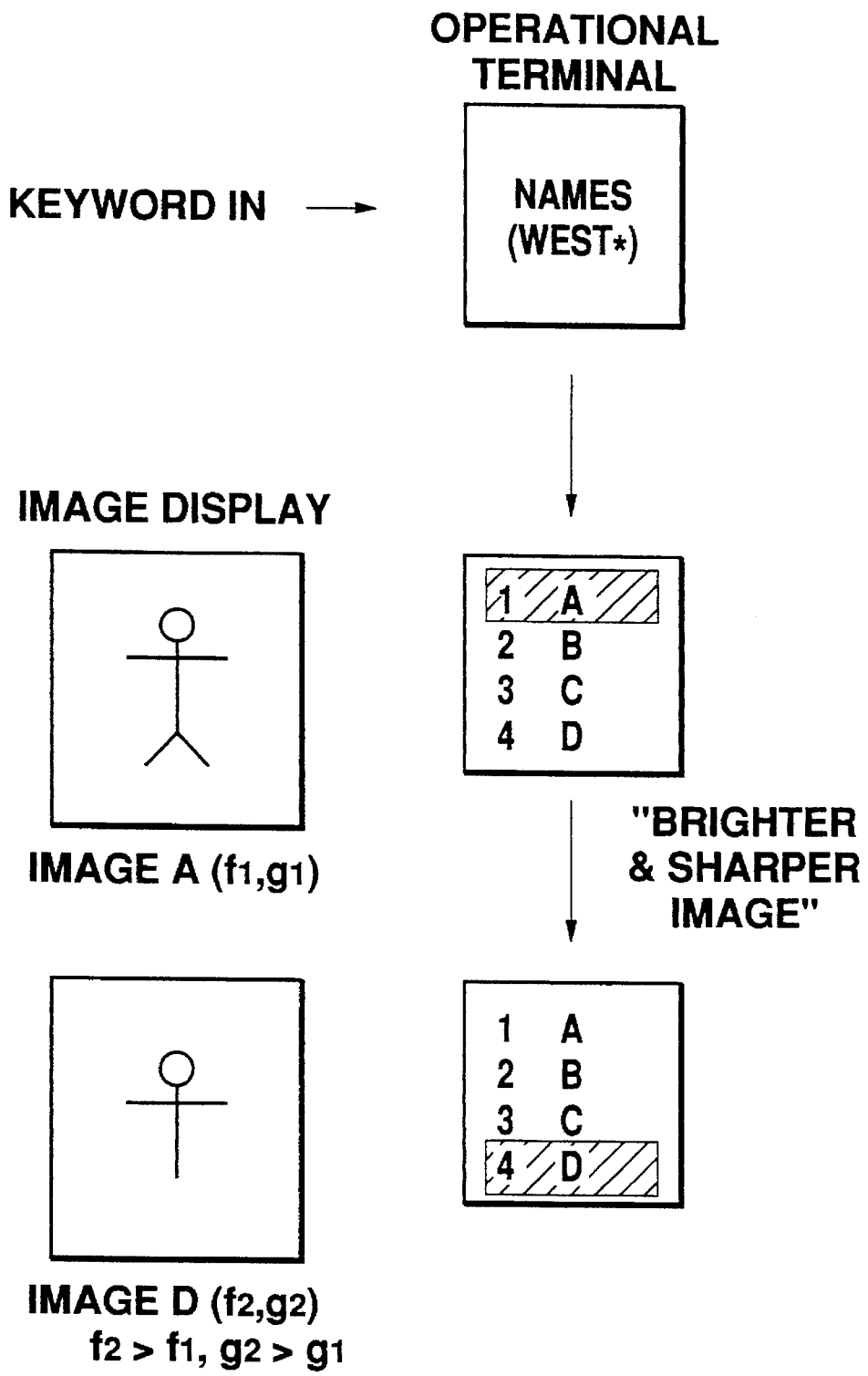
FIG. 2 is a schematic view showing a retrieval process of the conventional image filing system shown in FIG. 1.

The present invention will now be described in connection with its preferred embodiments with reference to the accompanying drawings, wherein like reference characters designate like or corresponding parts throughout the views and thus the repeated description thereof can be omitted for brevity.

Figures 3, 4:
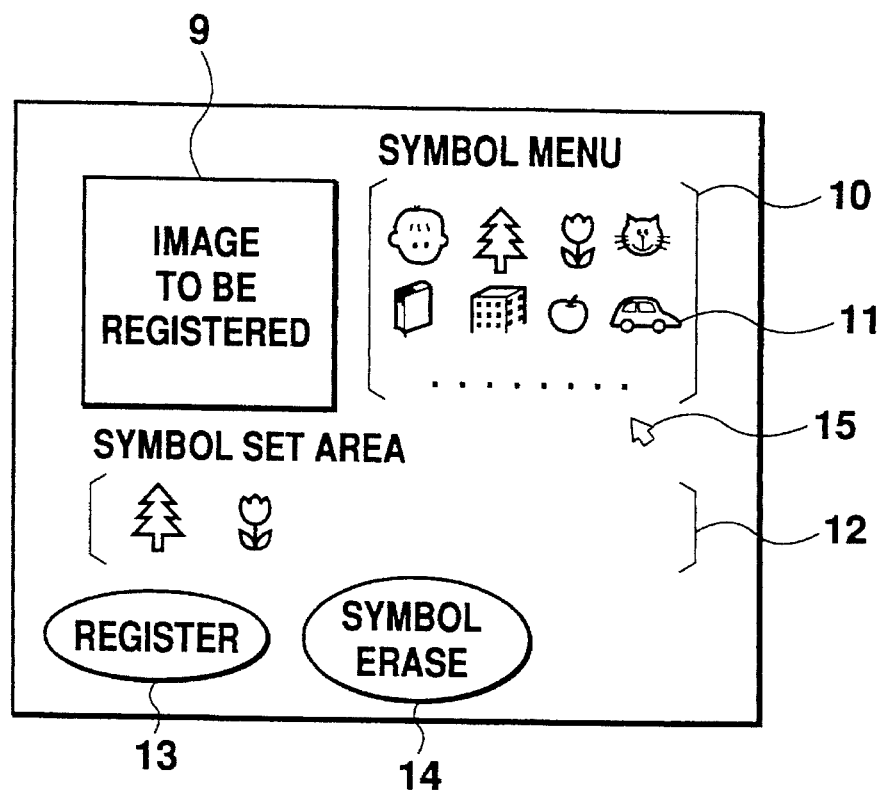
FIG. 3 is a schematic view showing a registration picture screen of an image data base system for performing a first embodiment of an image filing method according to the present invention.
FIG. 4 is a schematic view showing a data structure of the image data base system shown in FIG. 3.
Figure 5:
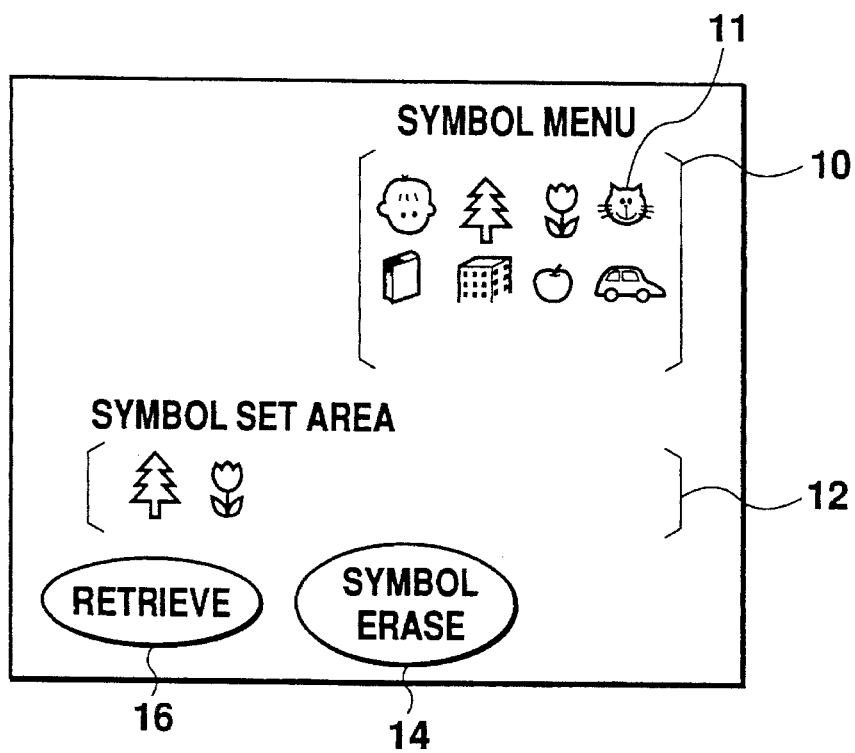
FIG. 5 is a schematic view showing a retrieval picture screen of the image data base system shown in FIG. 3.

First, the first embodiment of an image filing method according to the present invention will now be described. FIG. 3 shows a registration picture screen of an image data base system for performing the first embodiment of an image filing method according to the present invention, and FIG. 5 shows a retrieval picture screen of the same. As shown in FIG. 3, the registration picture screen includes an image display part 9 for displaying an image to be registered into an image data base system, a symbol menu 10, a symbol set area 12, a register button 13 and a symbol erase button 14. The symbol menu 10 includes a plurality of abstract symbols 11 characterizing objects containable in the images. A pointer 15 can point at any position within the registration picture screen by using a pointing device such as a mouse (not shown) or the like.

When a user creates an image to be registered, the created image is displayed in the image display part 9. Then, the user selects one symbol 11 corresponding to the characteristic object in the image from the symbol menu 10. More Specifically, the pointer 15 is moved on one symbol 11 to be selected by using the mouse, and the button provided on the mouse is pushed down and is then released (this operation is hereinafter referred to as "click the mouse") to perform this symbol selecting operation. The selected symbol 11 is displayed in the symbol set area 12. By repeating this symbol selecting operation, the setting of a plurality of symbols in the symbol set area 12 is possible, as shown in FIG. 3. Further, when the user has erroneously set the symbol 11 corresponding to an object which is not actually contained within the image, the pointer 15 is moved on the symbol 11 to be erased in the symbol set area 12 and the mouse is clicked to select the symbol 11 to be erased. At this time, a marking for indicating "presently selected" is attached to the selected symbol 11. In this situation, the pointer 15 is moved on the symbol erase button 14 and the mouse is clicked to erase the selected symbol 11 from the symbol set area 12.

After the user has set all symbols 11 corresponding to all characteristic objects present within the image in the symbol set area 12, as described above, the pointer 15 is moved on the register button 13 and the mouse is clicked in order to register the image with the retrieval information representing the presence of the objects corresponding to the symbols displayed in the symbol set area 12 within this image. A data structure of the images is shown in FIG. 4. As shown in FIG. 4, each registered image possesses its own file code, which is a so-called numbering for the images. When there are characteristic objects such as a person, a tree, a flower and the like, the data corresponding to the present objects are each "1" and the data corresponding to the absent objects are each "0". For example, the image of file code 0001 includes only the person and does not include any of the tree and the flower, and the image of file code 0002 does not include any of the person, the tree and the flower.

On the other hand, in FIG. 5, the retrieval picture screen includes the symbol menu 10 having a plurality of symbols 11, the symbol set area 12, a retrieve button 16 and the symbol erase button 14.

The user sets a retrieval condition of "an image including objects" by using the symbols. More specifically, similarly to the registration operation, when the user moves the pointer 15 on one symbol 11 within the symbol menu 10 and the mouse is clicked, the selected symbol 11 is displayed in the symbol set area 12. At the retrieval time, similarly to the registration operation, a plurality of symbols 11 can be set. Also, the erasing of the symbols 11 once set in the symbol set area 12 can be carried out in the same manner as the registration operation. After all symbols 11 are set in the symbol set area 12, as described above, the user moves the pointer 15 on the retrieve button 16 and the mouse is clicked to execute the retrieval. At this time, all images including the objects corresponding to the symbols 11 displayed in the symbol set area 12 can be retrieved. For instance, as shown in FIG. 5, when the symbols 11 of the tree and the flower are set in the symbol set area 12, the retrieval condition is "images including a tree and a flower", and the images with the file codes 0902 and 0903 are retrieved in the data shown in FIG. 4.

As described above, when a plurality of symbols are set in the symbol set area 12, all the images including a plurality of kinds of objects corresponding to the symbols can be retrieved.

As described above, in this embodiment, by using the symbols 11, the registration of the retrieval information and the set of the retrieval condition can be performed in a simpler manner compared with a conventional keyword input. Also, since the retrieval information as the symbols can appeal to the visual sense, the user's thinking can be helped and the possibility for giving a different key word to the same image by an operator can be avoided when using the key word. Hence, an image data base system capable of completely removing a registration error and a retrieval error can be constructed.

Figure 6:
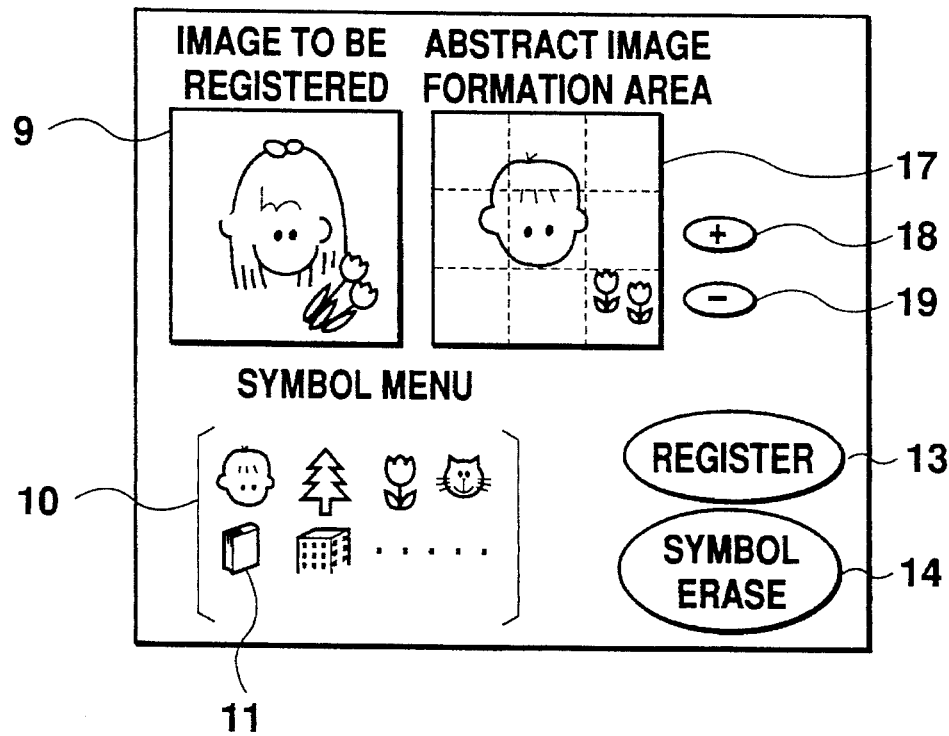
FIG. 6 is a schematic view showing a registration picture screen of an image data base system for performing a second embodiment of an image filing method according to the present invention.
Figures 9, 10:
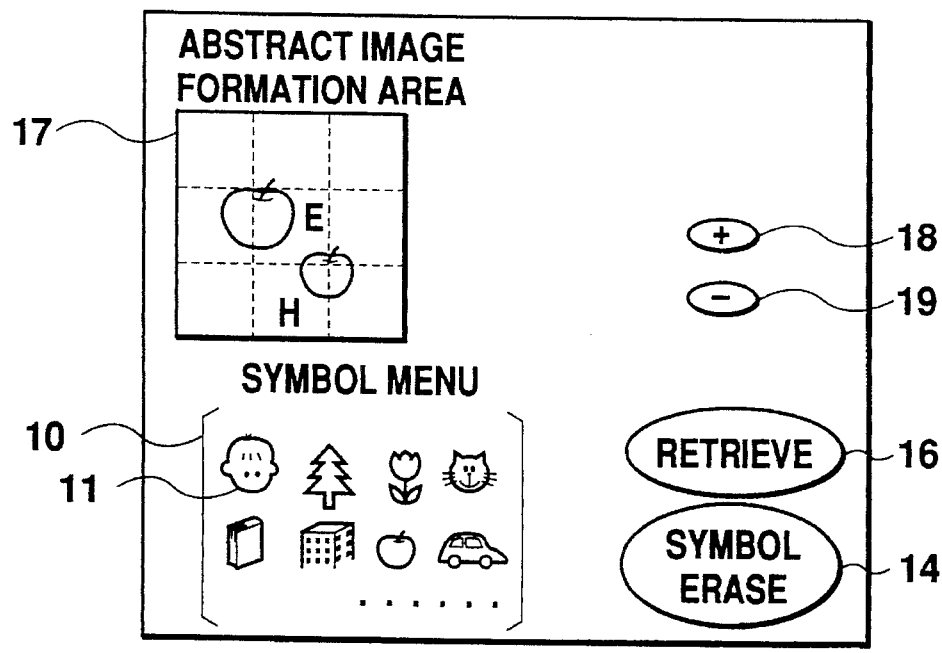
FIG. 9 is a schematic view showing a data structure of the image data base system shown in FIG. 6.
FIG. 10 is a schematic view showing a retrieval picture screen of the image data base system shown in FIG. 6.

Next, the second embodiment of an image filing method according to the present invention will now be described. In this embodiment, a position and a size of each object for characterizing the image are also provided as the retrieval information. In this embodiment, FIG. 6 shows the registration picture screen of an image data base system and FIG. 10 shows the retrieval picture screen of the same. In FIG. 6, the registration picture screen includes an image display part 9, an abstract image formation area 17 as a specified area, a symbol menu 10 having a plurality of abstract symbols 11, a symbol magnifying button 18, a symbol reducing button 19, a register button 13 and a symbol erase button 14.

The user creates one image to be registered to display in the image display part 9 and selects one symbol 11 corresponding to the characteristic object in the image displayed in the image display part 9 from the symbol menu 10. More specifically, this is carried out by moving the pointer 15 onto the symbol 11 within the symbol menu 10 and clicking the mouse. The selected image is displayed in the abstract image formation area 17. At this time, a marking for indicating "presently selected" is attached to the symbol 11 displayed in the abstract image formation area 17. In this embodiment, the user can freely move the marked symbol and can change its size by using the mouse. Next, when the pointer 15 is moved onto another symbol 11 displayed in the abstract image formation area 17 and the mouse is clicked, the clicked symbol 11 is newly marked. Also, when a new symbol 11 is selected from the symbol menu 10, the newly displayed symbol 11 is marked.

Figures 7, 8:
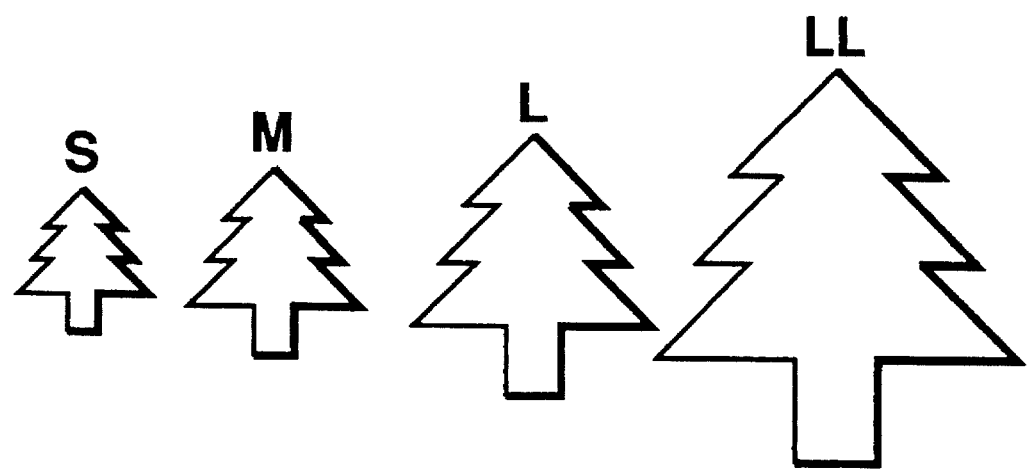
FIG. 7 is a schematic view showing kinds of various sizes of symbols used in the image data base system shown in FIG. 6.
FIG. 8 is a schematic view showing a division of a screener registering position information in the image database system shown in FIG. 6.

The setting of the size and the position of the marked symbol 11 within the abstract image formation area 17 can be performed as follows. That is, more specifically, the pointer 15 is moved on the marked symbol 11 within the abstract image formation area 17 and, while the button of the mouse is pushed, by moving the mouse, the marked symbol 11 is moved corresponding to the moving direction and the moving distance of the mouse. Further, the setting of the size of the symbol 11 is carried out as follows. That is, the pointer 15 is moved on the symbol magnifying button 18 and the mouse is clicked to enlarge the marked symbol 11 itself within the abstract image formation area 17 by one stage. On the other hand, the pointer 15 is moved on the symbol reducing button 19 and the mouse is clicked to reduce the marked symbol 11 by one stage. In this case, the symbol 11 has a plurality of stages of sizes, as shown in FIG. 7, and the size of the symbol 11 can be variable. As to the position of the symbol 11, as shown in FIG. 8, the screen is divided into a plurality of blocks having respective codes, and the position information is represented by the block code. In FIG. 8, the screen is divided into three in both vertical and horizontal directions to obtain nine blocks, and the codes A to I are allocated to the respective nine blocks. The code of the block where the center of the symbol 11 within the abstract image formation area 17 is positioned is registered as the position information in a table form data base file.

Further, when the symbol 11 erroneously displayed in the abstract image formation area 17 is erased, after the marking is carried out on the symbol 11 to be erased, the pointer 15 is moved on the symbol erase button 14 and the mouse is clicked to erase the marked symbol 11.

After all symbols corresponding to the objects present within the image to be registered are set with their optimum positions and sizes within the abstract image formation area 17, the pointer 15 is moved on the register button 13 and the mouse is clicked to register the retrieval information representing the presence of the objects corresponding to the symbols displayed with their positions and sizes in the abstract image formation area 17 in the table form data base file.

A structure of this data base file is shown in FIG. 9. For example, the registered image displayed in the image display part 9 of FIG. 6 is attached with a file code such as file code 0002 shown in FIG. 9. That is, the contents such as a person of a size L in the position E and two flowers of a size S in the position I are registered.

In turn, as shown in FIG. 10, the retrieval picture screen of the image data base system includes the symbol menu 10 having a plurality of symbols 11, the abstract image formation area 17, the symbol erase button 14, the retrieve button 16, the symbol magnifying button 18 and the symbol reducing button 19.

The user sets a retrieval condition of "an image including objects with their sizes and positions" by using the symbols. More specifically, similarly in the registration operation, when the user moves the pointer 15 on one symbol 11 within the symbol menu 10 and the mouse is clicked, the selected symbol 11 within the abstract image formation area 17, and the marking for indicating "presently selected" is attached to the selected symbol 11. In this case, at the retrieval time, the setting of the size and position of the symbol 11 within the abstract image formation area 17 and the erasing of the symbol 11 erroneously set can be performed in the same manner as the registration operation described above.

After all symbols 11 are set with their optimum positions and sizes in the abstract image formation area 17, as described above, the user moves the pointer 15 on the retrieve button 16 and the mouse is clicked to execute the retrieval. At this time, all images including the objects corresponding to the symbols 11 displayed with their positions and sizes within the abstract image formation area 17 can be retrieved. For instance, as shown in FIG. 10, when the retrieval is executed by setting the retrieval condition within the abstract image formation area 17, since the retrieval condition is an "image including a fruit of a size M in the position E and another fruit of a size S in the position H", and the image with the file code 0004 is retrieved in the data shown in FIG. 9.

In this embodiment, as described above, by providing the positions and sizes of the symbols as the retrieval information, the registration of the retrieval information and the setting of the retrieval condition more close to the actual image can be performed. That is, in this embodiment, the impression of the image the user sees can be made to the retrieval information and can be realized in a simple manner without requiring a complicated process for the user. Also, by adding the three conditions at the retrieval time, the narrowing of the retrieval images can be carried out, and thus the exact and quick retrieval can be performed.

Figure 11:
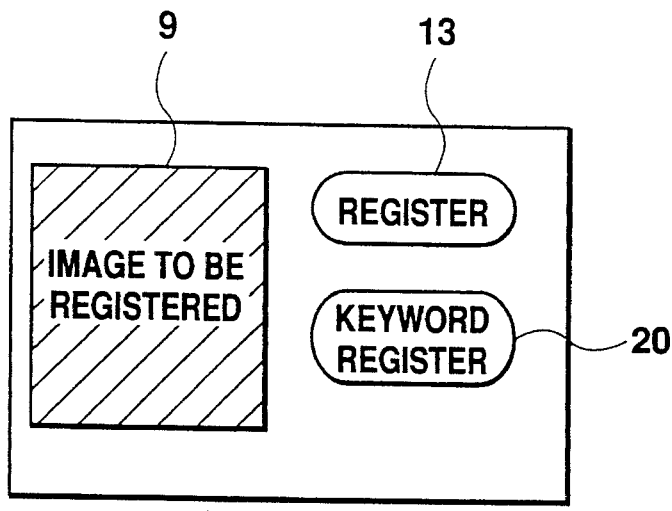
FIG. 11 is a schematic view showing a registration picture screen of an image data base system for performing third and fourth embodiments of an image filing method according to the present invention.
Figures 15, 16:
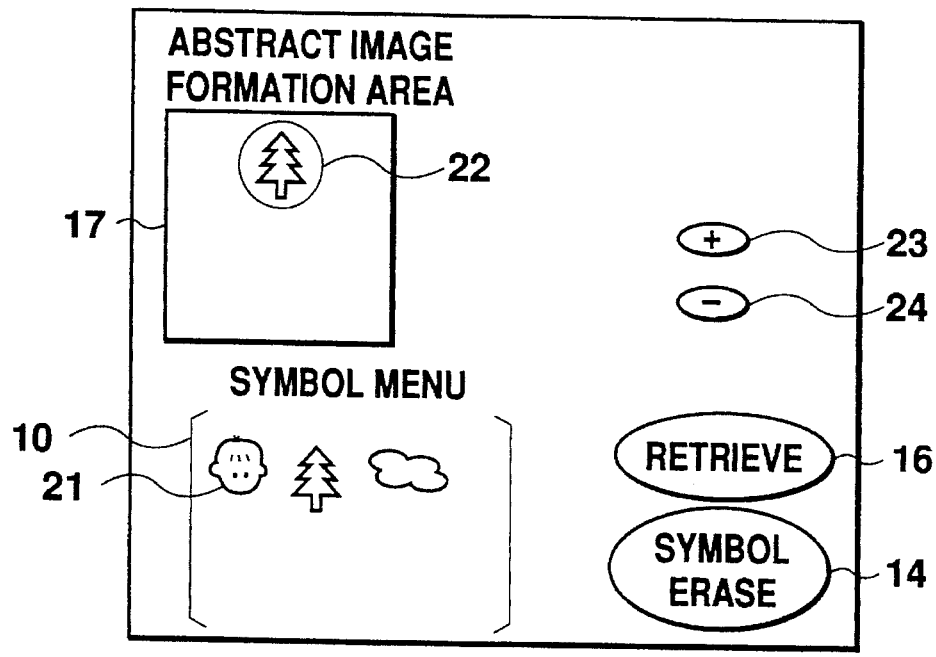
FIG. 15 is a schematic view showing a retrieval picture screen of the image data base system shown in FIG. 11 in the third embodiment of an image filing method according to the present invention.
FIG. 16 is a schematic view showing a data structure of the image data base system shown in FIG. 11 in the fourth embodiment of an image filing method according to the preset invention.

Then, the third embodiment of an image filing method according to the present invention will now be described. In this embodiment, in a color image, objects featuring in colors are recognized and the positions and sizes of the objects as the retrieval information are stored. FIG. 11 shows a registration picture screen of an image data base system and FIG. 15 shows a retrieval picture screen of the same. In FIG. 11, the registration picture screen includes an image display part 9, a register button 13 and a keyword register button 20.

Figures 13, 14:
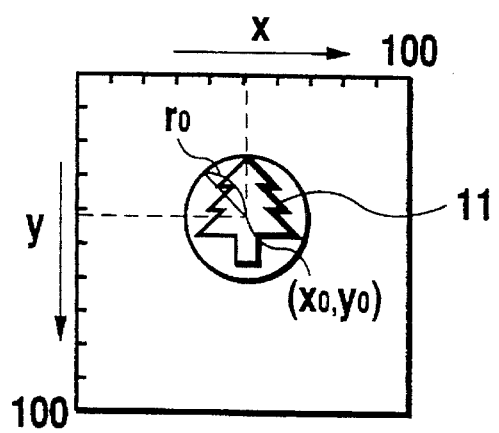
FIG. 13 is a schematic view showing a data structure of the image data base system shown in FIG. 11 in the third embodiment of an image filing method according to the present invention.
FIG. 14 is a schematic view showing a position and a size of a symbol in the image data base system shown in FIG. 11 in the third embodiment of an image filing method according to the present invention.

After the user recognizes the image displayed in the image display part 9, the pointer 15 is moved on the register button 13 and the mouse is clicked to calculate a position and a size of an object with a feature in color. The calculation result is registered to a file form data base file, as shown in FIG. 13. That is, the only manual operation at the registration time is the clicking of the register button 13. Further, as additional information, an input of a keyword is possible. That is, the pointer 15 is moved on the keyword register button 20 and the mouse is clicked to open a keyword input column (not shown). Hence, the key word input by the user as the retrieval information can be stored.

Figure 12:
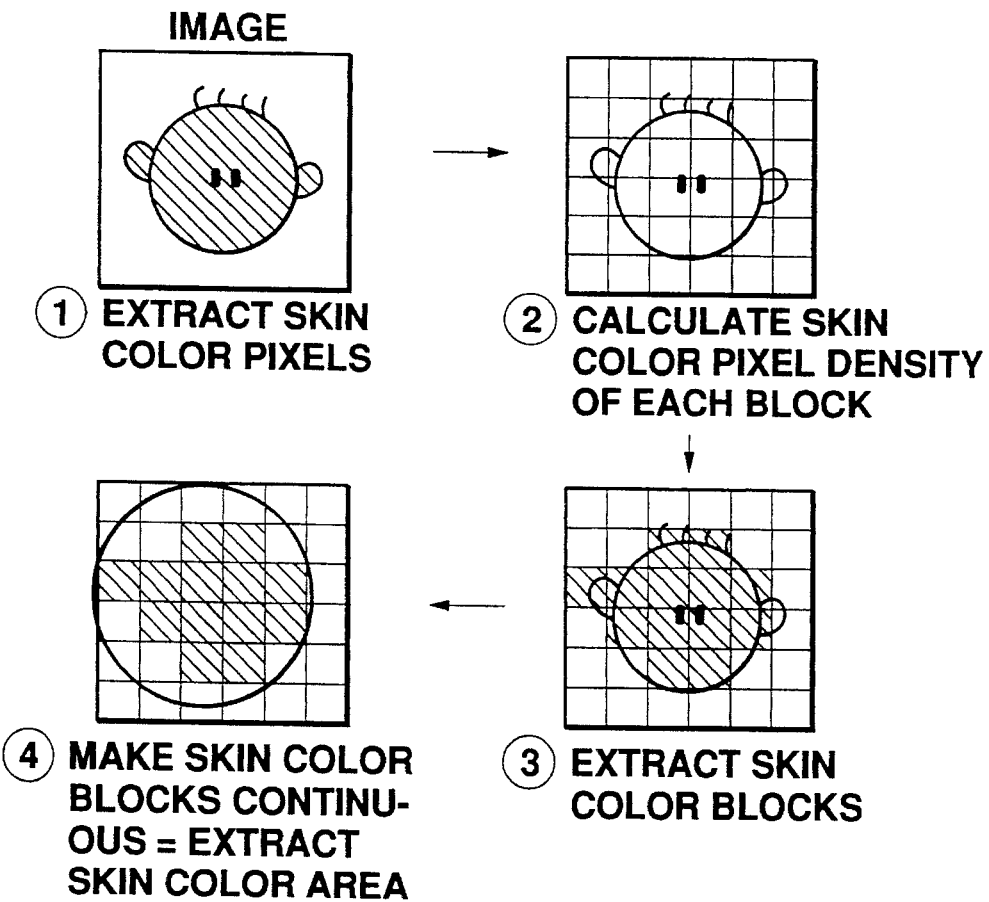
FIG. 12 is a schematic view showing an algorithm for carrying out a skin color area extraction in the image data base system shown in FIG. 11 in the third embodiment of an image filing method according to the present invention.

An algorithm for calculating the position and size of the object of the color image with the feature in color will now be described in connection with FIG. 12. In this instance, a skin color area is recognized and a position and a size of a person will be calculated.

(1) In a color space (hue, saturation and lightness) of three color attributes, areas are divided in advance. That is, in the CIE1976L* a* b* uniform color space determined by the CIE (International Commission on Illumination), the L* coordinate is defined as the lightness value. Then, a polar coordinate transformation of the a* b* plane is performed, and a distance from the origin and an angle around the origin are determined to the saturation and the hue, respectively. Next, in this color space of the hue, saturation and lightness, predetermined conditions are settled to determine a skin color area, a green area and a blue area. Then, for the input image, RGB (red, green and blue) data of pixels are mapped in the color space of the three color attributes, and it is discriminated which color area the image is included in. By this operation, a specific symbol of the color area is determined. (In FIG. 12, only a skin color extraction is shown and a person as a specific symbol is determined.)

(2) Then, a picture screen is divided into a plurality of blocks of a predetermined size, and a pixel density every color area in each block is calculated. When there exists the color area beyond a certain threshold value, this block is determined to the block (for example, a skin color block) of this color area.

(3) Next, the continuous same color blocks are integrated as the same area.

(4) Then, the coordinates $(x_0, y_0)$ of the central position of the continuous blocks are calculated. Also, as the size of the continuous blocks, a minimum circle having a radius $r_0$ for covering the continuous blocks around the coordinates $(x_0, y_0)$ is calculated. In this case, the calculated central coordinates $(x_0, y_0)$ and the radius $r_0$ of the circle are registered along with the kinds of the color areas. As described, by processing the clicked registered image, a data base is constructed.

The data structure obtained at this time is shown in FIG. 13. Also, the central coordinates $(x_0, y_0)$ of each symbol 11 at this time is settled, as shown in FIG. 14. For example, an image with a file code 0001 including retrieval information that there is a person of a size $r_0=15$ in a position (20, 28) is registered.

Next, FIG. 15 shows the retrieval picture screen of the image data base system. The retrieval picture screen includes an abstract image formation area 17, a symbol menu 10 having a plurality of symbols 21 corresponding to objects with features in color, a symbol magnifying button 23, a symbol reducing button 24 and a symbol erase button 14.

The user selects one symbol 21 specific in the color area, and the selected symbol 21 is displayed in the abstract image formation area 17. The setting of the size of the symbol 21 will be described as follows. That is, a circle 22 is displayed so as to surround the symbol 21 marked with "presently selected" within the abstract image formation area 17. In this state, the pointer 15 is moved on the symbol magnifying button 23 and the mouse is clicked to magnify the circle 22 by one unit. Further, the pointer 15 is moved on the symbol reducing button 24 and the mouse is clicked to reduce the circle 22 by one unit. As described above, within the abstract image formation area 17, the position of the symbol 21 is set and the size of the symbol 21 is set by the size of the circle 22 surrounding the symbol 21 to determine the retrieval condition. Then, the pointer 15 is moved on the retrieve button 16 and the mouse is clicked to execute the retrieval.

At the retrieval operation time, first, the color area of the selected symbol within the abstract image formation area 17 is discriminated. By this color area discrimination, this symbol as the symbol specific in the color area specifies the kind of the object shown in FIG. 13. Next, with respect to a position $(x_1, y_1)$ and a size $r_1$ of the symbol 21 set within the abstract image formation area 17, by using predetermined threshold values $l_{th}$ and $r_{th}$ (feature amount range), the following formulas are evaluated for each of the symbols.

$$(x_1-x_0)^2+(y_1-y_0)^2<l_{th}^2 \quad (1)$$

$$|r_1-r_0|<r_{th} \quad (2)$$

For all symbols 21 set within the abstract image formation area 17, the images having file codes of which these formulas (1) and (2) are true are retrieved as the target images.

For example, under the retrieval conditions set within the abstract image formation area 17 on the retrieval picture screen shown in FIG. 15, it is assumed that the x-, y- and z-coordinates of the position of the tree symbol are 50(x1), 20(y1) and 15(z1). Assuming that the threshold values $l_{th}$ and $r_{th}$ are 5 and 10, respectively, the above-described formulas (1) and (2) are evaluated as follows.

$$(x_1-x_0)^2+(y_1-y_{01})^2=9<l_{th}^2=25 \quad (3)$$

$$|r_1-r_{0=1=5}<r_{th}=10 \quad (4)$$

Since both formulas are true, when the retrieval is executed, the image with the file code 0003 having the values $x_0$, $y_0$ and $r_0$ satisfying the above formulas (3) and (4) can be retrieved.

As described above, by registering the positions and sizes of the objects with the features in color as the retrieval information in the data base of the images, the only image registration operation is the recognition of the image and the mouse clicking on the register button 13. Hence, the work time of the registration to the data base is largely reduced, and the individual difference in the image registration work by operators can be completely removed. Further, the retrieval based on the color classification of the color images can be carried out.

In this embodiment, although the threshold values $l_{th}$ and $r_{th}$ for representing the feature amount ranges of the images for the retrieval are predetermined, the threshold values $l_{th}$ and $r_{th}$ can be adapted to be changed by the operator in the retrieval picture screen with the result of the same effects as those of the aforementioned embodiments. In such a case, when a number of target images are retrieved, by reducing the threshold values $l_{th}$ and $r_{th}$, the range of the target images can be readily narrowed and thus the exact and quick retrieval can be performed.

Next, the fourth embodiment of an image filing method according to the present invention will be described. In this embodiment, the structure of the registration picture screen and the operation of the registration are the same as those of the third embodiment described above, as shown in FIG. 11 and thus can be omitted for brevity.

Figure 18:
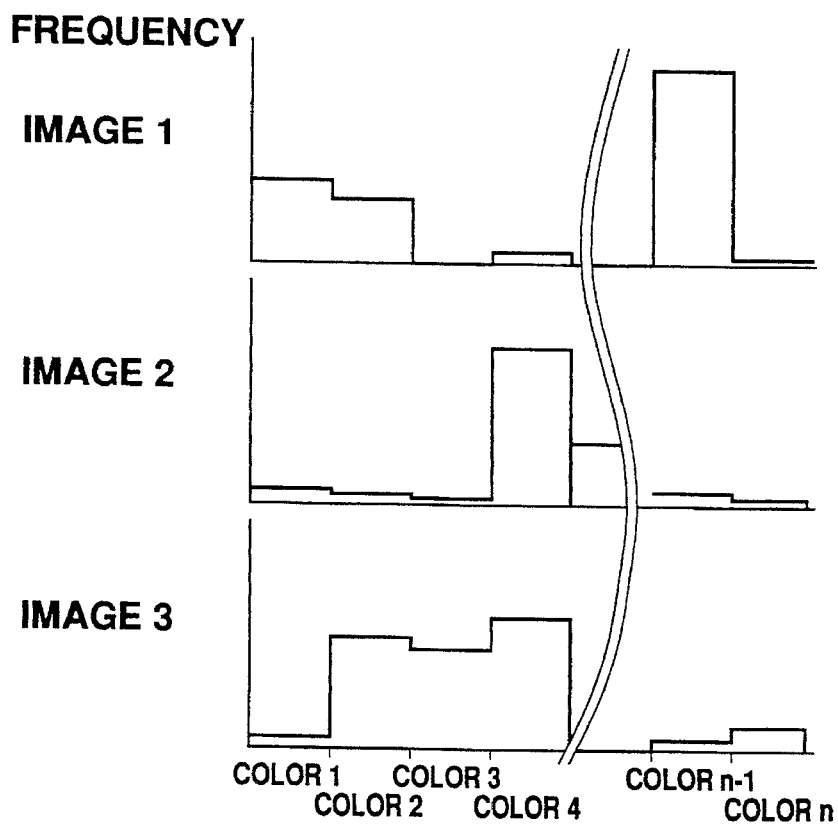
FIG. 18 is a schematic view showing histograms of color areas of images obtained ill the image data base system shown in FIG. 11 in the fourth embodiment of an image filing method according to the present invention.

In this embodiment, a data base formation processing of the images will now be described in detail. First, after the operator recognizes the image, the pointer 15 is moved on the register button 13, the mouse is clicked and a histogram of colors is calculated, as shown in FIG. 18. The calculation result is registered as the retrieval information. Also, the keyword input is possible. A data structure of the retrieval information in this embodiment is shown in FIG. 16. In this embodiment, since the keyword input is not always necessary, for the images with the file codes 0001 and 0002, no key word is registered. Numerals of items of color 1 and color 2 represent normalized parameters ni (i: numbers of color areas) rather than the calculated histogram of the colors. This show that, as the number (amount corresponding to a pixel number) of this color area is increased, the extent to which this color is contained in the image is increased.

Figure 17:
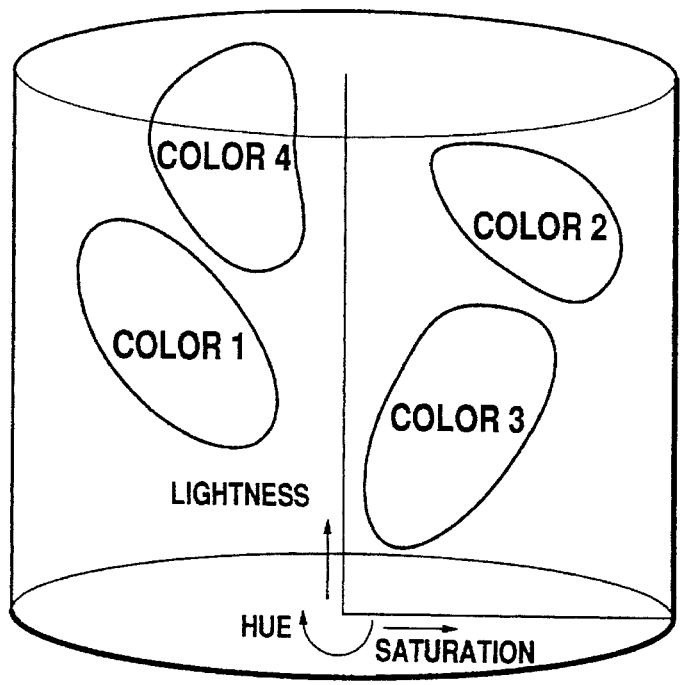
FIG. 17 is a schematic view showing a division of an area in a color space of three attributes in the image data base system shown in FIG. 11 in the fourth embodiment of an image filing method according to the present invention.

Now, the histogram of the colors will be described. In this embodiment, similarly to the third embodiment, in a color space (hue, saturation and lightness) of three color attributes, a plurality of color areas are determined in advance. FIG. 17 shows four color areas color 1, color 2, color 3 and color 4 determined in the color space (hue, saturation and lightness) of the three color attributes. When the image to be registered into the data base is given, it is discriminated whether or not every pixel of the image is included in these four color areas to form the histogram every color area.

Figure 19:
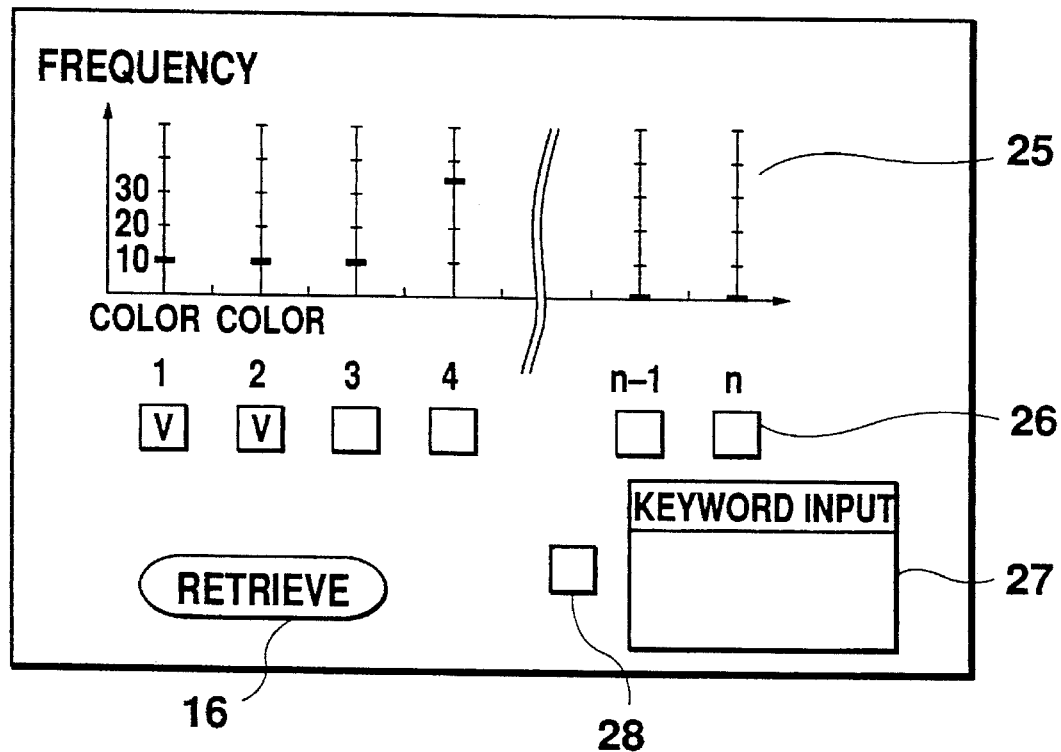
FIG. 19 is a schematic view showing a retrieval picture screen of the image data base system shown in FIG. 11 in the fourth embodiment of an image filing method according to the present invention.

FIG. 19 shows a retrieval picture screen of an image data base system. The retrieval picture screen includes a plurality of volume switches 25 for setting values corresponding to the histograms of the colors, a plurality of check boxes 26 for setting the selection of the colors, a keyword input column 27, a check box 28 for setting a keyword retrieval when retrieving by using a key word, and a retrieve button 16.

In this embodiment, the user sets the values corresponding to the histograms of the colors in place of the retrieval keys by moving the volume switches 25 by using the mouse. The check boxes 26 are displayed under the volume switches 25 for the colors, and the user clicks on the check boxes 26 of the colors to be used for the retrieval by using the mouse. Thus, the marking is given within the check boxes 26 clicked by the mouse, and only these marked colors are effective for the retrieval conditions. Also, when the user clicks on the check box 28 adjacent to the keyword input column 27 by using the mouse, the marking is given in the check box 28, and this indicates that the key word input in the keyword input column 27 is also effective as the retrieval condition.

After setting the retrieval condition, as described above, when the user clicks on the retrieve button 16 by using the mouse, the retrieval is carried out. By using values Vi (i: numbers of the color areas) set by the volume switches 25 and a predetermined threshold value $V_{th}$, the retrieval for the histograms of the colors is executed by evaluating the following formula.

$$|Vi-ni|<V_{th} \qquad (5)$$

Formula (5) is evaluated for all color areas made effective by the check boxes 26, and the images in which true results for all effective color areas can be retrieved as the target images. Further, when the keyword retrieval is performed, the check box 28 beside the keyword input column 27 is clicked by the mouse. After the above-described retrieval conditions are set, the retrieve button 16 is clicked by the mouse to execute the retrieval.

For instance, under the retrieval conditions shown in FIG. 19, only the color 1 and the color 2 are effective. The parameter values set in the color 1 and the color 2 are both 10, and assuming that the threshold value $V_{th}$ is 5, only the image with the file code 0002 can be retrieved. Further, when a designer for a fashion design or the like is intentionally change the colors, by carrying out the retrieval by setting the volume switches 25 to the desired levels at the retrieval time, the target images having the colors to meet the set levels can be retrieved, and this can be a readily operable graphic interface. As described above, by using the frequency of the colors as the retrieval information, the retrieval can be performed by using the colors which are the main features of the color images. Also, by automatically calculating the frequency of the colors, the unification of the retrieval information can be obtained. That is, the retrieval of the color image due to a color scheme can be carried out.

As described above, according to the present invention, a plurality of kinds of symbols featuring the objects of the images are set in advance, and the images are registered corresponding to the symbols selected from the set symbols. At the image retrieval time, the proper symbols are selected and the image corresponding to the selected symbols is read out. Hence, the working time in the image registration operation can be largely reduced, and the registration and retrieval errors due to the individual differences can be almost completely removed.

Also, according to the present invention, a plurality of kinds of symbols featuring the objects of the images can be selected and displayed in a particular area, and the images are registered corresponding to the kinds of the displayed symbols, the positions of the symbols with respect to the particular area and the sizes of the symbols. At the image retrieval time, the position and the size of the kinds of the symbols are selected, and the image corresponding to the selection is read out. Thus, in addition to the above-described effects, the narrowing of the retrieval images is possible for a large number of image data at the retrieval time, and hence the exact and quick retrieval can be carried out.

Further, according to the present invention, the color space is divided into a plurality of color areas, and the symbols specific to the color areas are set. The images are registered corresponding to at least one condition of the kinds of the symbols and the position and sizes of the symbols. At the image retrieval time, the retrieval is executed by using the above-described conditions as the retrieval condition. Hence, the registration and retrieval errors due to the individual differences can be almost completely removed, and the retrieval of the color images on the basis of the color classification can be performed.

Also, according to the present invention, the color space is divided into a plurality of color areas, and the pixel number included in each color area is calculated. The images are registered corresponding to the amount corresponding to the pixel number. At the image retrieval time, the retrieval is carried out by using the kinds of the color areas and the amount corresponding to the pixel number as the retrieval condition. Therefore, the retrieval of the color images due to the color scheme can be possible.

Further, according to the present invention, at the registration time of the images, the feature amounts of the images are calculated and stored, and at the image retrieval time, as the retrieval condition, the range of the feature amount is set. By changing the range of the feature amount, the extent of the retrieval condition can be changed. Hence, the optimum retrieval condition can be set, and more exact and speedy retrieval can be performed.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. An image filing method in which a plurality of images are registered in a storage means and a retrieval of the registered images is executed by adding a retrieval condition, each of the plurality of images having color defined by a color space, the method comprising the steps of:

(a) dividing the color space of each of the plurality of images into a plurality of color subspaces to assign a plurality of symbols, each of the plurality of symbols being specific to a corresponding one of the plurality of color subspaces;

(b) registering the images into the storage means corresponding to at least one condition of the kind, position and size of each of the plurality of symbols; and (c) reading the images corresponding to at least one condition of the kind, position and size of the plurality of symbols as the retrieval condition out of the storage means.

2. An image filing method in which a plurality of images are registered in a storage means and a retrieval of the registered images is executed by adding a retrieval condition, each of the plurality of images including pixels and having color defined by a color space, the method comprising the steps of:

(a) dividing the color space of each of the plurality of images into a plurality of color subspaces, and determining whether a color of each pixel of each image corresponds to any of the plurality of color subspaces, to calculate a number of pixels included in each of the plurality of color subspaces;

(b) registering the images into the storage means corresponding to the plurality of color subspaces and the number of pixels; and (c) reading the images corresponding to the plurality of color subspaces and the amounts corresponding to the number of pixels as the retrieval condition out of the storage means.

3. An image filing method in which a plurality of images are registered in a storage means and a retrieval of the registered images is executed by adding a retrieval condition, comprising the steps of:

(a) calculating a feature amount of each of the images, wherein the feature amount represents quantities of pixels of a particular color within the images;

(b) registering the images along with the feature amounts into the storage means; and (c) reading the images corresponding to a range of the feature amounts as the retrieval condition out of the storage means.

4. A method for storing an image, the image having color, the method comprising the steps of:

(a) displaying the image;

(b) determining a color position of the image, wherein the color position represents a geographic center of a contiguous area having a single color in the image;

(c) determining a color size of the image, wherein the color size represents an area of the contiguous area having a single color in the image; and (d) registering the image, so that the image is associated with the color position and the color size.

5. The method of claim 4, further including a step, prior to performing step (d), of:

selecting text to be associated with the image;

and wherein step (d) includes a step of registering the image, so that the image is associated with the color position, the color size, and the selected text.

6. The method of claim 4, wherein step (b) further includes the steps of:

dividing the image into a plurality of areas;

calculating a pixel density for a single color in each of the plurality of areas;

determining a contiguous area to be all adjacent areas from the plurality of areas having a pixel density for the single color exceeding a threshold; and calculating the color position to be a central position of the contiguous area;

and wherein step (c) further includes the step of calculating the color size to be a radius of a minimum circle which surrounds the contiguous area.

7. The method of claim 4, wherein the single color is one of blue, green, and a predefined skin color.

8. A method for retrieving an image, the image being associated with a color position representing a geographic center of a contiguous area of the image having a single color and a color size representing a size of the contiguous area, the method comprising the steps of:

(a) selecting a symbol;

(b) selecting a color size for the symbol;

(c) selecting a color position for the symbol; and (d) displaying all images having a color size within a threshold of the selected color size for the symbol and having a color position within a threshold of the selected color position for the symbol.

9. The method of claim 8, the image being further associated with text, the method further comprising a step, prior to performing step (d), of selecting text;

and wherein step (d) includes displaying all images having a color size within a threshold of the selected color size for the symbol, having a color position within a threshold of the selected color position for the symbol, and being associated with the selected text.

10. The method of claim 8, further comprising a step, prior to performing step (d), of setting one of the threshold for color size and the threshold for color position.

11. A method for storing an image, the image having color, the method comprising the steps of:

(a) displaying the image;

(b) dividing the image into a plurality of areas;

(c) determining a pixel number for each of the plurality of areas, wherein the pixel number represents a number of pixels of a single color within an area; and (d) registering the image, so that the image is associated with the pixel numbers.

12. The method of claim 11, further including a step, prior to performing step (d), of:

selecting text to be associated with the image;

and wherein step (d) includes registering the image, so that the image is associated with the pixel numbers and the selected text.

13. The method of claim 11, wherein the single color is one of blue, green, and a predefined skin color.

14. A method for retrieving an image, the image being associated with at least one pixel number, the method comprising the steps of:

(a) selecting a pixel number corresponding to a number of pixels of a single color;

(b) displaying a group of images, each of the group of images having a pixel number within a threshold of the selected pixel number; and (c) selecting the image from the group of images.

15. The method of claim 14, the image being further associated with text, the method further comprising a step, prior to performing step (b), of selecting text;

and wherein step (b) includes displaying a group of images, each of the group of images having a pixel number within a threshold of the at least one pixel number and being associated with the selected text.

16. The method of claim 14, further comprising a step, prior to the step of performing step (d) of setting the threshold.

17. A method for storing an image, the image having color, the method comprising the steps of:

(a) determining a first frequency of occurrence of a first color;

(b) determining a second frequency of occurrence of a second color; and (c) registering the image, so that the image is associated with the first frequency and the second frequency.

18. A method for retrieving an image having a first frequency of occurrence of a first color and a second frequency of occurrence of a second color, the method comprising the steps of:

(a) selecting a third frequency of occurrence of the first color;

(b) selecting a fourth frequency of occurrence of the second color;

(c) displaying a group of images, each of the group of images having a first frequency of occurrence within a first threshold range about the third frequency of occurrence and having a second frequency of occurrence within a second threshold range about the fourth frequency of occurrence; and (d) selecting the image from the group of images.

19. The method of claim 18, further comprising a step, prior to performing step (c), of setting one of the first and second threshold ranges.

20. An apparatus for storing an image, the image having color, the apparatus comprising:

first means for displaying the image;

second means, coupled to the first means, for determining a color position of the image, wherein the color position represents a geographic center of a contiguous area having a single color in the image;

third means, coupled to the first means, for determining a color size of the image, wherein the color size represents an area of the contiguous area having a single color in the image; and fourth means, coupled to the second and third means, for registering the image, so that the image is associated with the color position and the color size.

21. The apparatus of claim 20, further including:

means, coupled to the second and third means, for selecting text to be associated with the image;

and wherein the fourth means registers the image so that the image is associated with the color position, the color size, and the selected text.

22. The apparatus of claim 21, wherein the second means further includes:

means for dividing the image into a plurality of areas;

means, coupled to the means for dividing, for calculating a pixel density for a single color in each of the plurality of areas;

means, coupled to the means for calculating a pixel density, for determining a contiguous area to be all adjacent areas from the plurality of areas having a pixel density for the single color exceeding a threshold; and means, coupled to the means for determining, for calculating the color position to be a central position of the contiguous area;

and wherein the third means further includes means for calculating the color size to be a radius of a minimum circle which surrounds the contiguous area.

23. The apparatus of claim 20, wherein the single color is one of blue, green, and a predefined skin color.

24. An apparatus for retrieving an image, the image being associated with a color position representing a geographic center of a contiguous area of the image having a single color and a color size representing a size of the contiguous area, the apparatus comprising:

first means for selecting a symbol;

second means, coupled to the first means, for selecting a color size for the symbol;

third means, coupled to the first means, for selecting a color position for the symbol; and fourth means, coupled to the second and third means, for displaying all images having a color size within a threshold of the selected color size for the symbol and having a color position within a threshold of the selected color position for the symbol.

25. The apparatus of claim 24, wherein the image is further associated with text, the apparatus further comprising:

means, coupled to the first means, for selecting text;

and wherein the images displayed by the fourth means are also associated with the selected text.

26. The apparatus of claim 24, further comprising means for setting one of the threshold for color size and the threshold for color position.

27. An apparatus for storing an image, the image having color, the apparatus comprising:

means for displaying the image;

means, coupled to the means for displaying, for dividing the image into a plurality of areas;

means, coupled to the means for dividing, for determining a pixel number for each of the plurality of areas, wherein the pixel number represents a number of pixels of a single color within an area; and means, coupled to the means for determining, for registering the image, so that the image is associated with the pixel numbers.

28. The apparatus of claim 27, further including:

means, coupled to the means for displaying, for selecting text to be associated with the image;

and wherein the means for registering registers the image so that the image is associated with the pixel numbers and the selected text.

29. The apparatus of claim 27, wherein the single color is one of blue, green, and a predefined skin color.

30. An apparatus for retrieving an image, the image being associated with at least one pixel number, the apparatus comprising:

first means for selecting a number corresponding to a number of pixels of a single color;

second means, coupled to the first means, for displaying a group of images, each of the group of images having a pixel number within a threshold of the selected pixel number; and third means, coupled to the second means, for selecting the image from the group of images.

31. The apparatus of claim 30, wherein the image is further associated with text, the apparatus further comprising:

means, coupled to the first means, for selecting text;

and wherein each of the group of images displayed by the second means is also associated with the selected text.

32. The apparatus of claim 30, further comprising means for setting the threshold.

33. An apparatus for storing an image, the image having color, the apparatus comprising:

first means for determining a first frequency of occurrence of a first color;

second means, coupled to the first means, for determining a second frequency of occurrence of a second color; and third means, coupled to the first and second means, for registering the image, so that the image is associated with the first frequency and the second frequency.

34. An apparatus for retrieving an image having a first frequency of occurrence of a first color and a second frequency of occurrence of a second color, the apparatus comprising:

first means for selecting a third frequency of occurrence of the first color;

second means, coupled to the first means, for selecting a fourth frequency of occurrence of the second color;

third means, coupled to the first and second means, for displaying a group of images, each of the group of images having a first frequency of occurrence within a first threshold range about the third frequency of occurrence and having a second frequency of occurrence within a second threshold range about the fourth frequency of occurrence; and fourth means, coupled to the third means, for selecting the image from the group of images.

35. The apparatus of claim 34, further comprising means for setting one of the first and second threshold ranges.

36. The method of claim 1, wherein the color space is defined by a combination of a value of hue, a value of saturation, and a value of lightness, and wherein the step of dividing the color space includes dividing the color space into a plurality of color subspaces including a color subspace of skin color, the color subspace of skin color being defined by a combination of a predetermined skin color value of hue, a predetermined skin color value of saturation, and a predetermined skin color value of lightness.

37. The method of claim 2, wherein the color space is defined by a combination of a value of hue, a value of saturation, and a value of lightness, and wherein the step of dividing the color space includes dividing the color space into a plurality of color subspaces including a color subspace of skin color, the color subspace of skin color being defined by a combination of a predetermined skin color value of hue, a predetermined skin color value of saturation, and a predetermined skin color value of lightness.

* * * * *